United States Patent
Marupaduga (10) Patent No.: US 11,770,763 B1
(45) Date of Patent: Sep. 26, 2023

(54) DYNAMIC SELECTION OF AN ANCHOR NODE

(71) Applicant: T-Mobile Innovations LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/170,279

(22) Filed: Feb. 8, 2021

(51) Int. Cl.
*H04W 48/20* (2009.01)
*H04W 28/02* (2009.01)
*H04W 76/28* (2018.01)
*H04W 76/15* (2018.01)

(52) U.S. Cl.
CPC ....... *H04W 48/20* (2013.01); *H04W 28/0268* (2013.01); *H04W 76/15* (2018.02); *H04W 76/28* (2018.02)

(58) Field of Classification Search
CPC ..... H04W 48/20; H04W 76/15; H04W 76/28; H04W 28/0268
See application file for complete search history.

(56) References Cited

U.S. PATENT DOCUMENTS

| | | | |
|---|---|---|---|
| 10,021,571 B2* | 7/2018 | Lindqvist | H04J 14/02 |
| 10,827,551 B1* | 11/2020 | Marupaduga | H04W 28/0226 |
| 11,109,202 B2* | 8/2021 | Yang | H04W 4/50 |
| 11,158,939 B2* | 10/2021 | Yilmaz | H01Q 1/24 |
| 11,277,797 B1* | 3/2022 | Marupaduga | H04W 52/0261 |
| 11,304,123 B1* | 4/2022 | Noonan | H04W 12/04 |
| 11,323,906 B2* | 5/2022 | Chen | H04W 48/20 |
| 2015/0319664 A1* | 11/2015 | Perras | H04W 36/22 370/331 |
| 2016/0337957 A1* | 11/2016 | Gonsalves | H04W 48/20 |
| 2018/0167118 A1* | 6/2018 | Kakishima | H04W 72/04 |
| 2018/0262913 A1* | 9/2018 | Ravishankar | H04W 60/00 |
| 2018/0343608 A1* | 11/2018 | Duan | H04W 48/10 |
| 2019/0037417 A1* | 1/2019 | Lei | H04W 36/0069 |
| 2019/0150050 A1* | 5/2019 | Kinthada Venkata | H04W 36/30 370/334 |
| 2019/0191351 A1* | 6/2019 | Chong | H04W 72/543 |
| 2019/0238345 A1* | 8/2019 | Gage | H04L 9/0833 |
| 2019/0239181 A1* | 8/2019 | Gangakhedkar | H04W 76/10 |
| 2019/0364468 A1* | 11/2019 | Yerramalli | H04W 36/0069 |
| 2020/0052803 A1* | 2/2020 | Deenoo | H04B 17/318 |
| 2020/0329438 A1* | 10/2020 | Kim | H04W 52/265 |

(Continued)

FOREIGN PATENT DOCUMENTS

WO WO-2022024048 A1 * 2/2022

*Primary Examiner* — Parth Patel
(74) *Attorney, Agent, or Firm* — SHOOK, HARDY & BACON, L.L.P.

(57) ABSTRACT

Systems and methods are provided for dynamically selecting a dual connectivity anchor node for a user device. It is determined that the user device is located in an area having two or more nodes that are able to provide coverage to the user device in the area. From broadcast messages, it is determined whether each of the two or more nodes has a CDRX mode enabled or disabled. Then, a QCI is determined for the user device. Based on whether the each of the two or more nodes has the CDRX mode enabled and the QCI for the user device, one of the two or more nodes is selected as the dual connectivity anchor node for the user device.

18 Claims, 8 Drawing Sheets

(56) References Cited

U.S. PATENT DOCUMENTS

| | | | |
|---|---|---|---|
| 2020/0367311 A1* | 11/2020 | Choi | H04W 76/16 |
| 2021/0044993 A1* | 2/2021 | Jha | H04W 36/0083 |
| 2021/0099934 A1* | 4/2021 | Panchal | H04L 5/0098 |
| 2021/0211952 A1* | 7/2021 | Teyeb | H04W 76/15 |
| 2021/0251029 A1* | 8/2021 | Sanders | H04W 76/15 |
| 2021/0266801 A1* | 8/2021 | Shah | H04W 76/16 |
| 2021/0329539 A1* | 10/2021 | Surisetty | H04W 60/04 |
| 2021/0329723 A1* | 10/2021 | Teyeb | H04W 12/037 |
| 2021/0345203 A1* | 11/2021 | Balasubramanian | H04W 60/04 |
| 2021/0385815 A1* | 12/2021 | Rico Alvarino | H04W 72/0453 |
| 2022/0015171 A1* | 1/2022 | Chung | H04W 24/10 |
| 2022/0053600 A1* | 2/2022 | Ganig | H04W 48/18 |
| 2022/0077896 A1* | 3/2022 | Jung | H04B 7/0617 |
| 2022/0110038 A1* | 4/2022 | Shih | H04W 8/02 |
| 2022/0124592 A1* | 4/2022 | Takahashi | H04L 5/0091 |
| 2022/0131276 A1* | 4/2022 | Kim | H01Q 21/064 |
| 2022/0132625 A1* | 4/2022 | Mattam | H04W 76/19 |

\* cited by examiner

DYNAMIC SELECTION OF AN ANCHOR NODE

The present disclosure is directed, in part, to dynamically selecting a dual connectivity anchor node for a user device. The dual connectivity anchor node, in an aspect herein, is a node that allows a user device to connect to a first node (e.g., a 4G or LTE node) that acts as a primary node, and also a second node (e.g., 5G node) that acts as a secondary node. In one aspect, the primary node operates using E-UTRAN New Radio-Dual Connectivity (ENDC), which allows a user device to access both the primary and secondary nodes simultaneously on the same spectrum band. As used herein, an anchor node, or a dual connectivity anchor node refers to the primary node, as described herein. The anchor node is selected for a user device that is located in an area covered by two or more nodes, and based on one or more of a number of factors, described in more detail herein.

According to various aspects of the technology, an anchor node is selected for a user device that is located in an area that is covered by two or more nodes. The selection may be based on, in one aspect, whether the CDRX mode of the two or more nodes is enabled or disabled. A node having the CDRX mode disabled may be selected for the user device when the user device is currently running VoLTE, voice calling, videoconferencing, gaming, or other applications that require constant signaling without interruption. When CDRX mode is disabled, the node will not go to sleep at particular intervals, as it would if CDRX mode is enabled.

According to another aspect, an anchor node is selected for a user device based on leg switching information from the nodes. Generally, when leg switching is high (or at least high relative to the other nodes), the user device is forced to switch between 4G and 5G so much that battery life of the user device and user experience are adversely affected. As such, when multiple nodes are available for selection as the anchor node, in this aspect, the node with the lowest leg switching may be the node selected.

According to yet another aspect, an anchor node is selected for a user device based on the number of transmit paths present at each node. The number of transmit paths may correlate with the number of antennas at a node. As such, the more antennas associated with a particular node (e.g., 8, 32, 64), the more available transmit paths. Generally, the more transmit paths available at a node, the higher the feasibility there is to send additional data by way of that node, resulting in a higher throughput.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, 3GPP standards documents define E-UTRAN New Radio-Dual Connectivity (ENDC). ENDC allows user devices to connect to an LTE (4G) eNodeB that acts as a master node, along with one or more 5G gNodeB that acts as a secondary node. With some carriers, this would allow a device to have both LTE and 5G access on the same spectrum band. Traditionally, selection of an ENDC anchor node involves analysis of radio frequency (RF) conditions of each node. This would occur, for example, when there are multiple nodes that provide coverage to the area where the user device is located. As such, the user device and/or the network have a choice as to which node is selected as that user device's anchor node.

A first aspect of the present disclosure is directed to a system for dynamically selecting a dual connectivity anchor node for a user device. The system includes a processor and one or more computer storage hardware devices storing computer-usable instructions that, when used by the processor, cause the processor to perform steps. The steps include determining that the user device is located in an area having two or more nodes that are able to provide coverage to the user device in the area, and from broadcast messages, determining whether each of the two or more nodes has a CDRX mode enabled. The steps also include determining a QCI for the user device, and based on whether the each of the two or more nodes has the CDRX mode enabled and the QCI for the user device, selecting one of the two or more nodes as the dual connectivity anchor node for the user device.

A second aspect of the present disclosure is directed to a method for dynamically selecting a dual connectivity anchor node for a user device. The method includes determining that the user device is located in an area having two or more nodes that are able to provide coverage to the user device in the area, receiving uplink leg switching information from the two or more nodes, and selecting the dual connectivity anchor node from the two or more nodes based at least on the received uplink leg switching information.

According to another aspect of the technology described herein, a method is provided for dynamically selecting a dual connectivity anchor node for a user device. The method includes determining that the user device is located in an area having two or more nodes that are able to provide coverage to the user device in the area. For each of the two or more nodes, the method includes determining that a quantity of transmit paths supported by transmitting antennas, and antenna gain. Further, the method includes, based on a prioritization of the quantity of the transmit paths and the antenna gain, selecting the dual connectivity anchor node from the two or more nodes.

Figure 1:
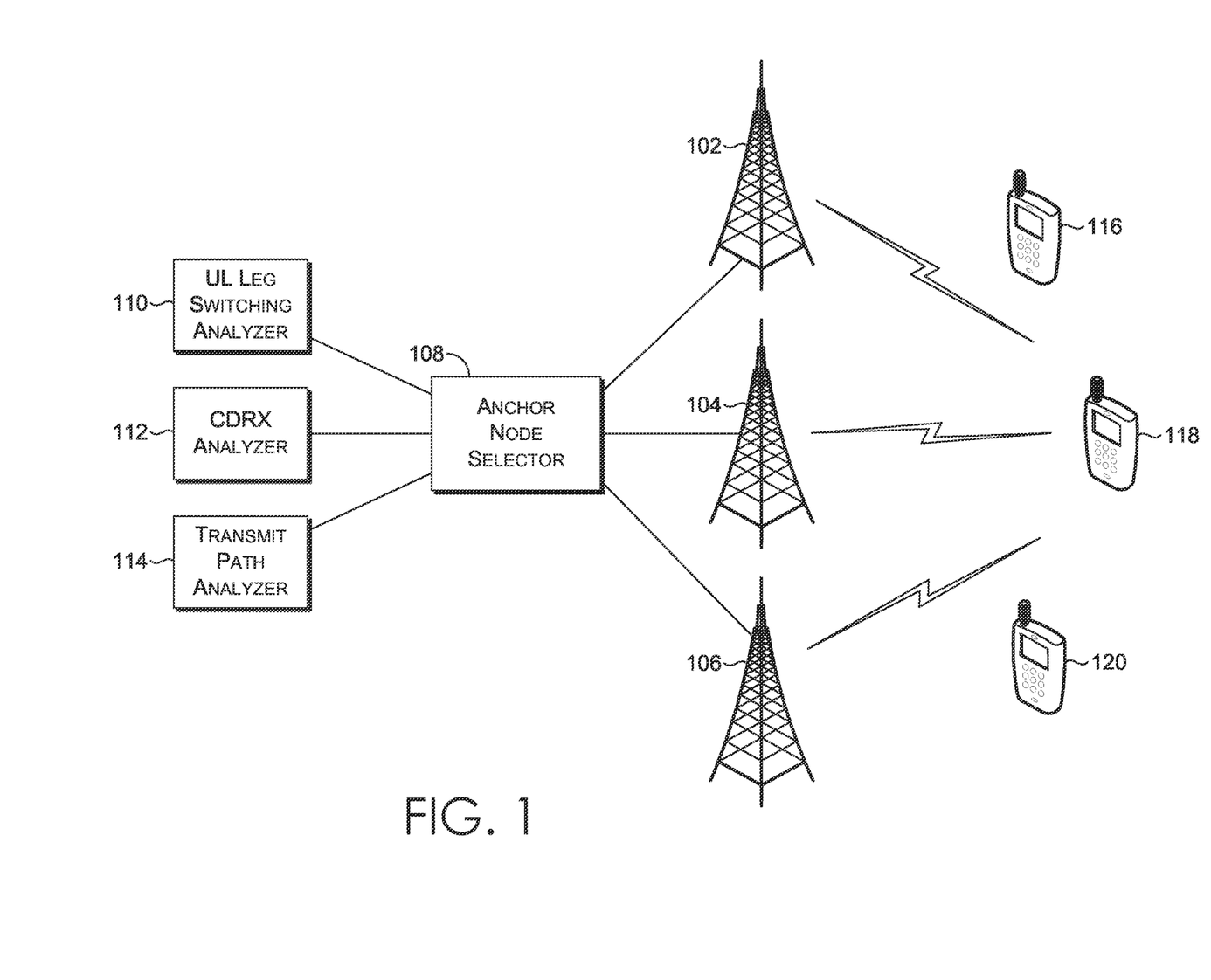
FIG. 1 depicts a diagram of an exemplary computing environment suitable for use in implementations of the present disclosure.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes anchor node selector 108, uplink (UL) leg switching analyzer 110, CDRX analyzer 112, transmit path analyzer 114, nodes 102, 104, and 106, and user devices 116, 118, and 120. In network environment 100, user devices 116, 118, and 120 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 800) that communicates via wireless communications with one or more of nodes 102, 104, and 106 in order to interact with a public or private network.

Figure 8:
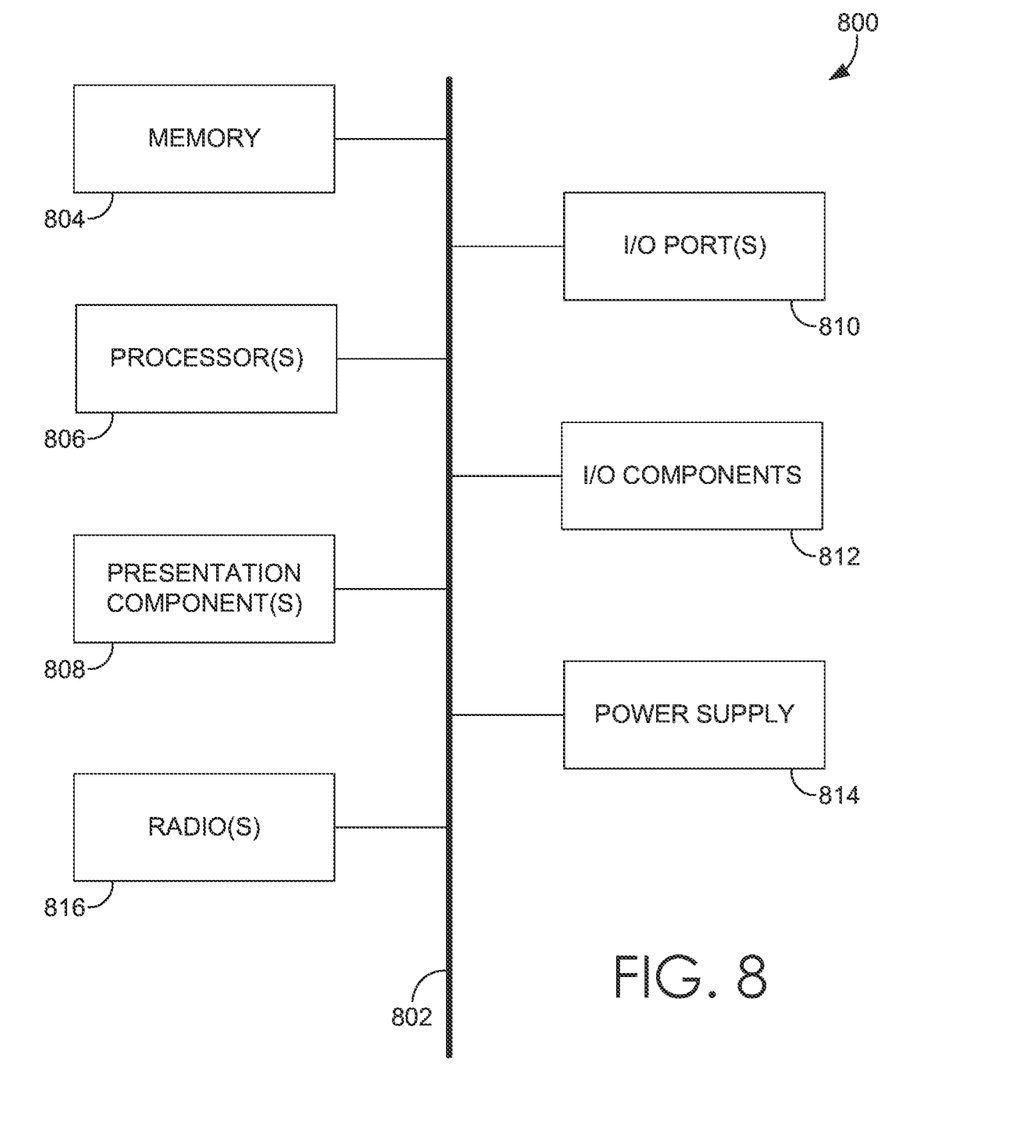
FIG. 8 depicts an exemplary computing environment suitable for use in implementations of the present disclosure.

In some aspects, the user devices 116, 118, and 120 may correspond to computing device 800 in FIG. 8. Thus, a user device can include, for example, a display(s), a power source(s) (e.g., a battery), a data store(s), a speaker(s), memory, a buffer(s), a radio(s) and the like. In some implementations, a user device (such as user devices 116, 118, and 120) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, user devices 116, 118, and 120 in network environment 100 can optionally utilize a network (not shown) to communicate with other computing devices (e.g., a mobile device(s), a server(s), a personal computer(s), etc.) through one or more of nodes 102, 104, and 106. The network may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

The network can be part of a telecommunication network that connects subscribers to their immediate service provider. In some instances, the network can be associated with a telecommunications provider that provides services (e.g., voice, data, SMS) to user devices, such as user devices 116, 118, and 120. For example, the network may provide voice and non-voice services, including SMS, and/or data services to user devices or corresponding users that are registered or subscribed to utilize the services provided by a telecommunications provider. The network can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, nodes 102, 104, and 106 are configured to communicate with user devices, such as user devices 116, 118, and 120 that are located within the geographical area, or cell, covered by the one or more antennas of nodes 102, 104, and/or 106. Nodes 102, 104, and 106 may include one or more base stations, nodes, base transmitter stations, radios, antennas, antenna arrays, power amplifiers, transmitters/receivers, digital signal processors, control electronics, GPS equipment, and the like. In particular, user devices 116, 118, and 120 may communicate with nodes 102, 104, and 106, according to any one or more of a variety of communication protocols, in order to access the network.

In aspects, user devices 116, 118, and 120 may be capable of communicating using 4G (e.g., LTE) and 5G. In some aspects, user devices 116, 118, and 120 may be E-UTRAN New Radio-Dual Connectivity devices (ENDC). ENDC allows a user device to connect to an LTE eNodeB that acts as a master node and a 5G gNodeB that acts as a secondary node. As such, in these aspects, user devices 116, 118, and 120 may access both LTE and 5G simultaneously, and in some cases, on the same spectrum band. As shown in FIG. 1, user devices 116, 118, and 120 communicate by way of transmission with nodes 102, 104, and/or 106 using one or more of 4G and 5G, sometimes simultaneously. Additionally, other wireless communication protocols may be utilized in conjunction with aspects described herein, as LTE and 5G are used for exemplary purposes only and not for limitation.

In aspects, the UL leg switching analyzer 110 is responsible for gathering leg switching information from nodes 102, 104, and 106. In aspects not shown in FIG. 1, the leg switching information may be sent directly from nodes 102, 104, and 106 to user devices 116, 118, and 120. But here, the information is sent to UL leg switching analyzer 110, which is a network component. UL leg switching, as referred to herein, is when a user device switches between a first connection and a second connection, such as between a 5G signal and a 4G signal. For instance, a user device may have a 5G signal, loses the 5G signal (e.g., the 5G signal is not strong enough), gets handed off to 4G, and back and forth. When leg switching increases above a threshold, it can affect the user experience and uses excessive network resources. As such, when a user device or the network selects the best anchor node for the user device, in one aspect herein, UL leg switching information is taken into account. The node with the lowest UL leg switching may be selected as the user device's anchor node.

CDRX analyzer 112, like UL leg switching analyzer 110 receives and keeps track of certain information sent by nodes 102, 104, and 106. For CDRX analyzer 112, information relating to CDRX mode is received. For example, each node 102, 104, and 106 may have a CDRX mode indicating whether CDRX is turned on or off at that particular time. When CDRX is on, the user device may be allowed to enter into sleep mode for a predetermined amount of time (e.g., 30-40 ms), and then check if there is any signaling needing to be transmitted or received. However, as mentioned herein, some applications used by a particular user device need CDRX to be turned off so that the device does not go to sleep. For example, when a user device is running VoLTE, voice calling, videoconferencing, gaming, etc., it is best for CDRX to not be turned on. As such, CDRX analyzer 112 receives this information, which is then used by anchor node selector 108 to determine which node is to be selected as the anchor node for a particular device.

Transmit path analyzer 114 operates in a similar fashion to UL leg switching analyzer 110 and CDRX analyzer 112 in that it also receives information from nodes 102, 104, and 106. In the case of the transmit path analyzer 114, information associated with a number of transmit paths for each node 102, 104, and 106 is sent to the transmit path analyzer 114 and then subsequently used by the anchor node selector 108 to determine which node is to be selected as the anchor node for a particular device. In aspects, a number of transmit paths corresponds to a number of antennas used at a particular node. For instance, some nodes may have 4, 8, 16, or 32 antennas, while more recently installed nodes may have 64 antennas. Returning to FIG. 1, information is sent from UL leg switching analyzer 110, CDRX analyzer 112, and/or transmit path analyzer 114 to anchor node selector 108 so that an anchor node selection can be made for a particular user device 116, 118, or 120.

Figure 2:
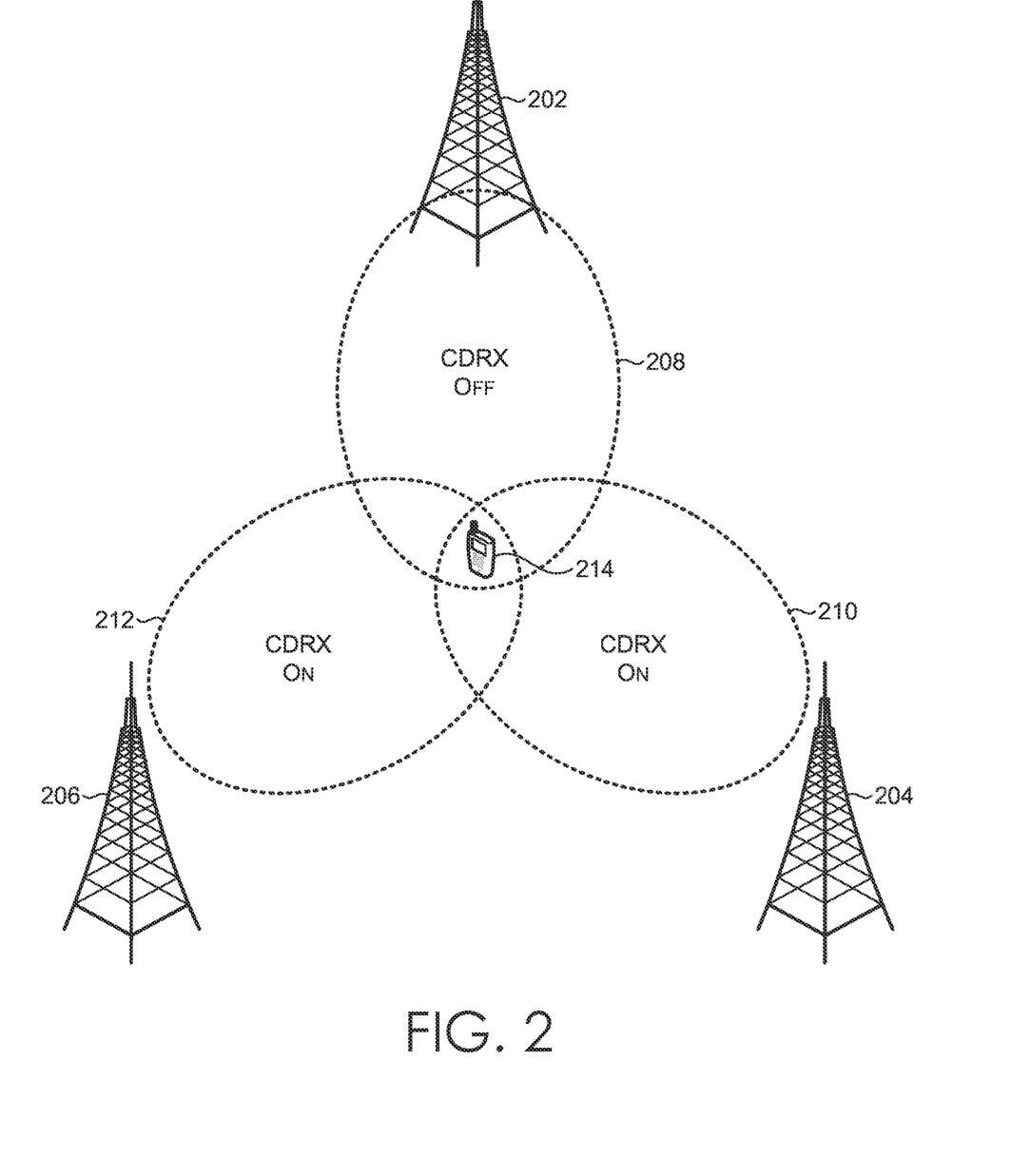
FIG. 2 depicts a diagram of a user device selecting an anchor node based on the CDRX mode, in accordance with aspects herein.

FIG. 2 depicts a diagram of a selection of an anchor node for a user device based on a CDRX setting, in accordance with aspects herein. FIG. 2 corresponds with an aspects provided herein where the status of a CDRX setting (e.g., whether it is on or off) is used to select an anchor node for a user device. For instance, instead of RF conditions, which are traditionally solely used for this purpose, here, the network and/or a user device looks at a node's CDRX setting to make an anchor node selection. In FIG. 2, nodes 202, 204, and 206 each has a coverage area which overlaps with one another. For instance, node 202 has coverage area 208, node 204 has coverage area 210, and node 206 has coverage area 212. User device 214 is located in an area with overlapping coverage from nodes 202, 204, and 206. Therefore, user device 214 may receive a signal from any of these nodes. In order to determine which of nodes 202, 204, 206 is the best anchor node for user device 214, here, the CDRX setting is analyzed. In some aspects, RF conditions are additionally analyzed. As shown, for node 202, CDRX is off. The CDRX setting for both nodes 204 and 206 is on. Therefore, if user device 214 is being used for VoLTE, voice calling, videoconferencing, gaming, or other applications that require constant signaling without interruption, a node having the CDRX setting off may be selected for user device 214. As such, node 202 may be selected as anchor node for user device 214.

Figure 3:
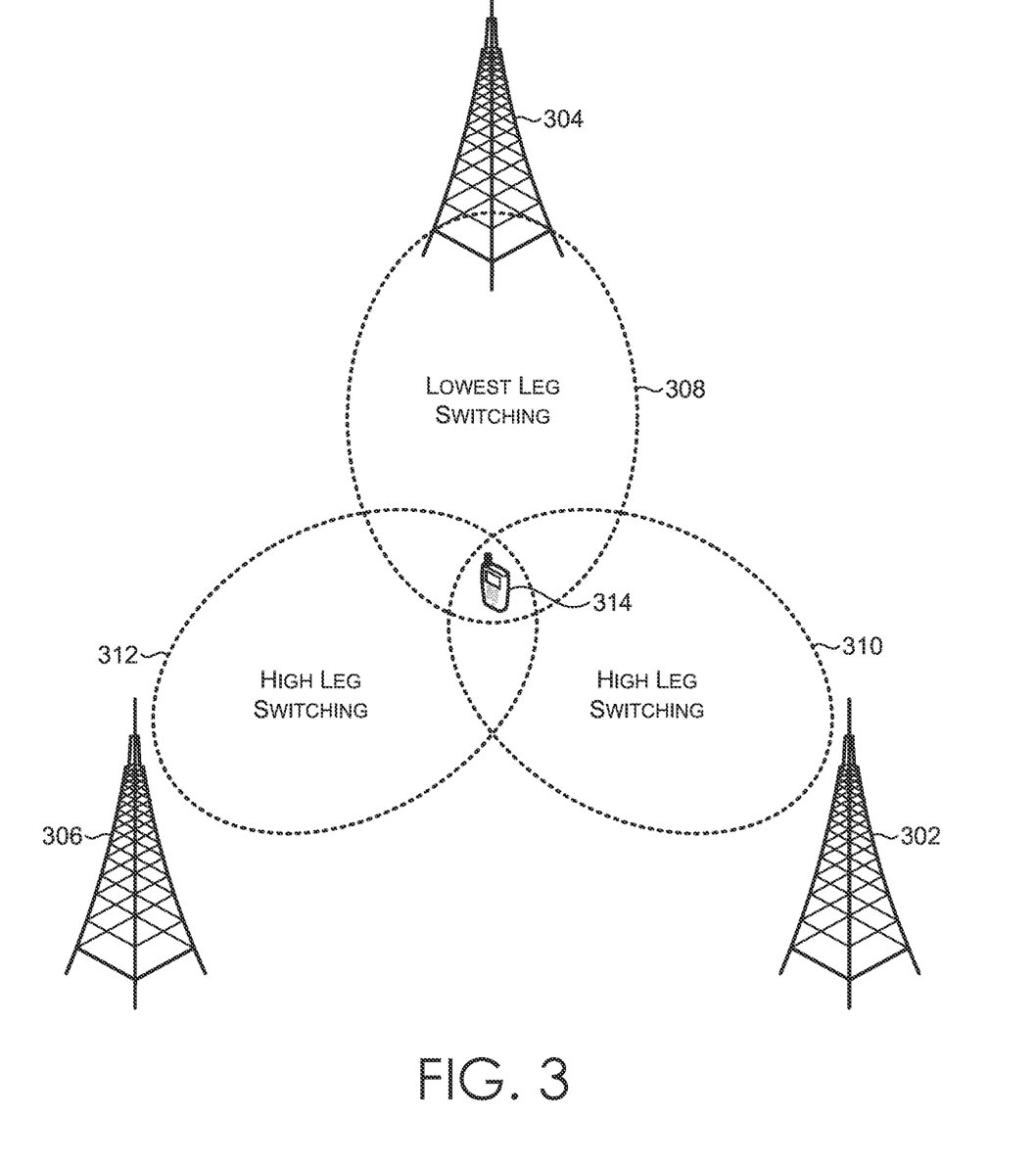
FIG. 3 depicts a diagram of a user device selecting an anchor node based on the leg switching, in accordance with aspects herein.

Turning now to FIG. 3, a diagram is depicted of a selection of an anchor node for a user device based on the leg switching, in accordance with aspects herein. Similar to FIG. 2, three nodes are illustrated, each having an associated coverage area. Here, node 302 has coverage area 310, node 304 has coverage area 308, and node 306 has coverage area 312. However, instead of selecting an anchor node for a user device based on a CDRX setting, here, leg switching information is used. As mentioned, leg switching refers to a user device switching from a first signal to a second signal, such as from 4G to 5G. If leg switching becomes too high, the user device's battery will drain, user performance may become impacted, and the user's perception about service may degrade. As such, in the aspect illustrated in FIG. 3, it may be determined that node 304 is experience lower leg switching then either nodes 302 or 306, and thus for at least this reason, node 304 may be selected as the anchor node for user device 314.

Figure 4:
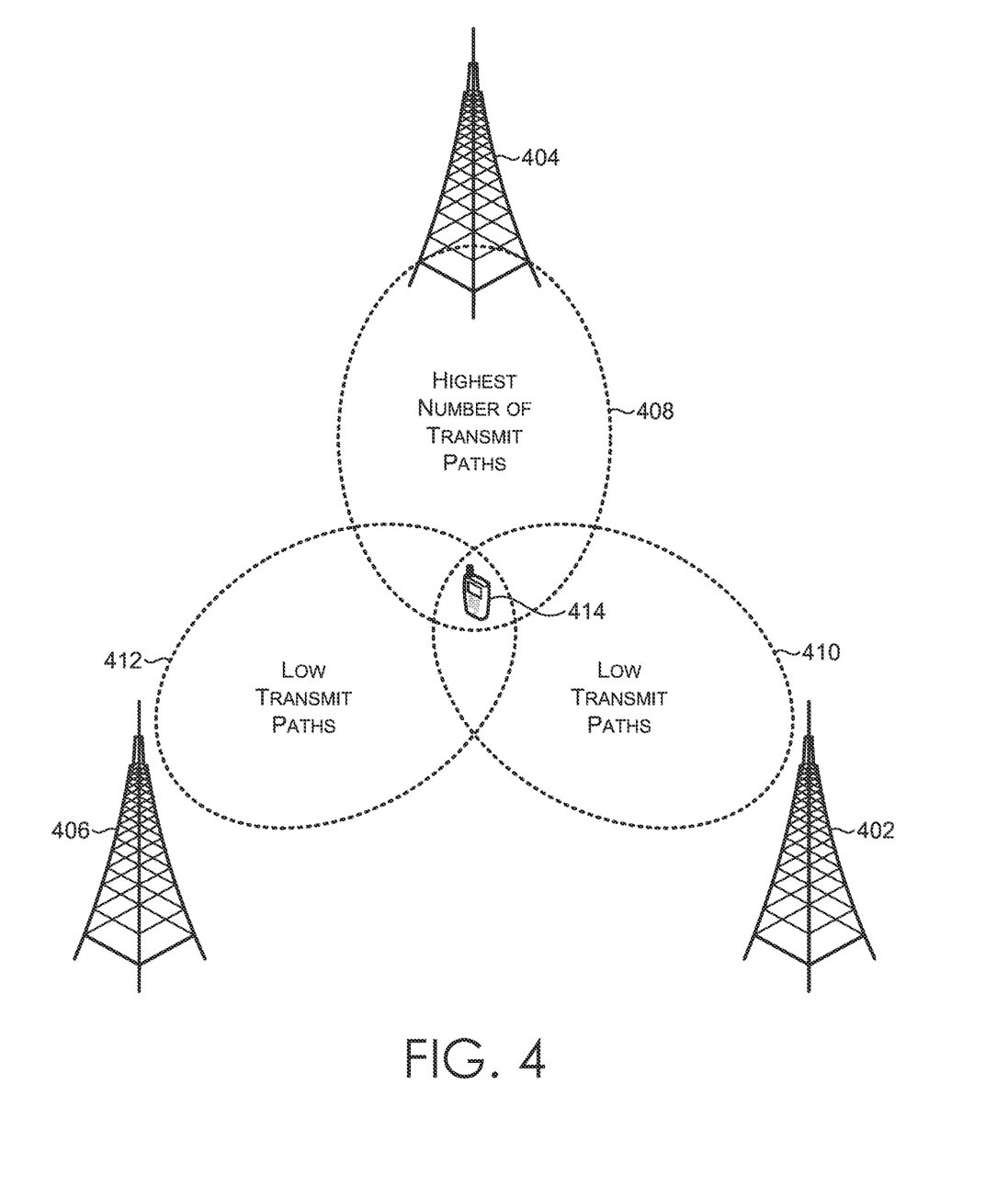
FIG. 4 depicts a diagram of a user device selecting an anchor node based on the transmit paths, in accordance with aspects herein.

FIG. 4 depicts a diagram of a selection of an anchor node for a user device based on the transmit paths, in accordance with aspects herein. FIG. 4, like FIGS. 2 and 3, illustrates three nodes, each having a corresponding coverage area. Here, node 402 is associated with coverage area 410, node 404 is associated with coverage area 408, and node 406 is associated with coverage area 412. In the aspect of FIG. 4, the number of transmit paths is used to determine which anchor node to select for user device 414. As detailed above, transmit paths, in one aspect, correspond to a number of antennas transmitting data from a node. As such, the more antennas are used at a particular node, the more transmit paths there will be. With a higher number of transmit paths, there is more feasibility of sending additional data on those paths, meaning higher throughput. In addition to number of transmit paths, antenna gain may also be used in selection of an anchor node for the user device 414. In aspects, a prioritization of the number of transmit paths and antenna gain as the factors to determine the anchor node is made. In some aspects, the node with the highest antenna gain and highest number of transmit paths may be selected as the anchor node. For exemplary purposes only, a node with 8 transmit paths is prioritized after a node with 32 or 64 transmit paths. If a node has a high number of transmit paths but a low gain, either the user device 414 or a network component may determine, by way of an algorithm, for example, if that node should be selected as the anchor node for user device, or if another node should be selected. As such, it may not be as simple as selecting the node with the highest gain and the highest number of transmit paths, as the choice may be convoluted at times. In addition, RF conditions may be used in the determination of anchor node.

Figure 5:
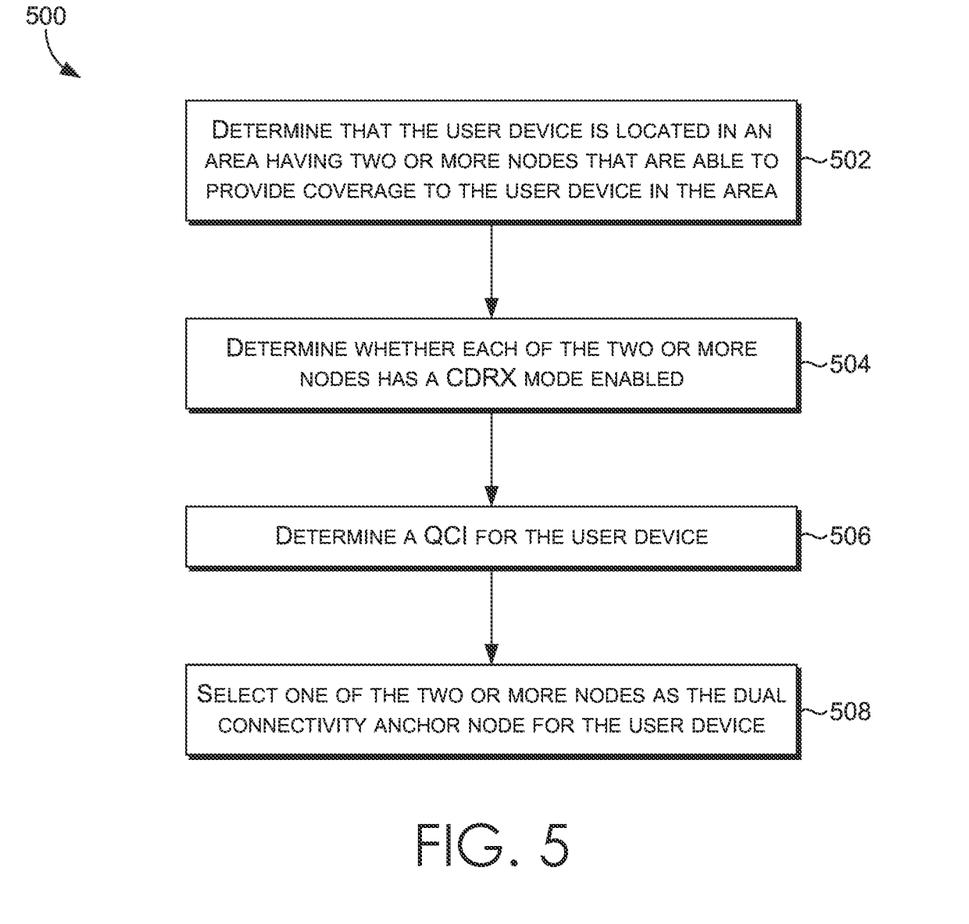
FIGS. 5-7 depict flow diagrams of exemplary methods for dynamically selecting a dual connectivity anchor node for a user device, in accordance with aspects herein.

FIG. 5 depicts a flow diagram of an exemplary method 500 for dynamically selecting a dual connectivity anchor node for a user device, in accordance with aspects herein. At block 502, it is determined that the user device is located in an area having two or more nodes that are able to provide coverage to the user device in that area. As such, the user device and/or the network has a choice as to which node is to be used for primary communications with the user device, or which node is to be used as the anchor node. At block 504, it is determined whether each of the two or more nodes has a CDRX mode enabled. As previously mentioned, CDRX mode being enabled indicates that the node may go to sleep at some interval of time. There are certainly benefits, in some instances, to connect to a node having the CDRX mode enabled. For example, if a user device is not currently running VoLTE, voice calling, videoconferencing, gaming, or other applications that require constant signaling without interruption, a node having the CDRX mode enabled may be selected for that user device, as this would save battery life of the user device and would be less likely to interrupt and applications or services being utilized by the user device. However, if the user device is currently running VoLTE, voice calling, videoconferencing, gaming, or other applications that require constant signaling without interruption, a node having the CDRX mode disabled may be the better selection for the user device. The node having the CDRX mode disabled would not go to sleep, but instead would consistently be sending and receiving signals to/from the user device. In this scenario, the user device, currently running a service or application that requires constant signaling without interruption, would not experience lags and other interruptions that would come with connecting to a node having the CDRX mode enabled.

At block 506, a QCI is determined for the user device. A QCI may be associated with each application or service running on the user device. As such, multiple QCIs may be associated with the user device, and as such, block 506 may comprise determining multiple QCIs for the user device, not just one. The QCI indicates what types of applications are running on the user device. As described above, a user device running VoLTE, voice calling, videoconferencing, gaming, or other applications that require constant signaling without interruption may do better with a node having the CDRX mode disabled so that the node does not go to sleep. In one aspect, a QCI having the highest value is the one that is used in determination of the anchor node. At block 508, one of the nodes is selected as the dual connectivity anchor node for the user device. This selection is based, at least, on the CDRX mode and the QCI.

Figure 6:
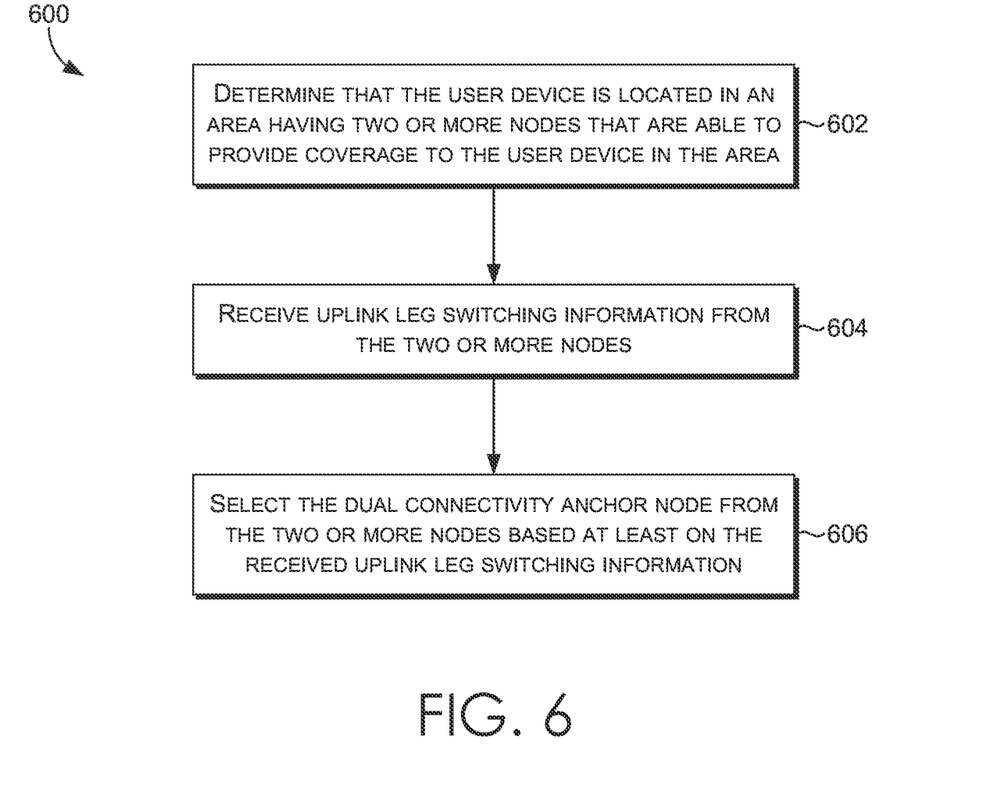

FIG. 6 depicts a flow diagram of an exemplary method 600 for dynamically selecting a dual connectivity anchor node for a user device, in accordance with aspects herein. At block 602, it is determined that the user device is located in an area having two or more nodes that are able to provide coverage to the user device in that area. As such, the user device and/or the network has a choice as to which node is to be used for primary communications with the user device, or which node is to be used as the anchor node. At block 604, uplink leg switching information is received from the two or more nodes. Uplink leg switching information provides an indication as to how many times a user device is being switched from, for example, 4G to 5G within a quantity of time. If this becomes too frequent, such as above some predetermined threshold, the user device may experience battery loss at a faster rate, and may experience a decreased user experience in general. Network resources are also expended at a higher rate when leg switching is high. Here, the nodes may provide average leg switching data. At block 606, a dual connectivity anchor node is selected from the two or more nodes based at least on the received uplink leg switching information. In aspects, the node with the lowest leg switching may be selected for the user device as its anchor node.

Figure 7:
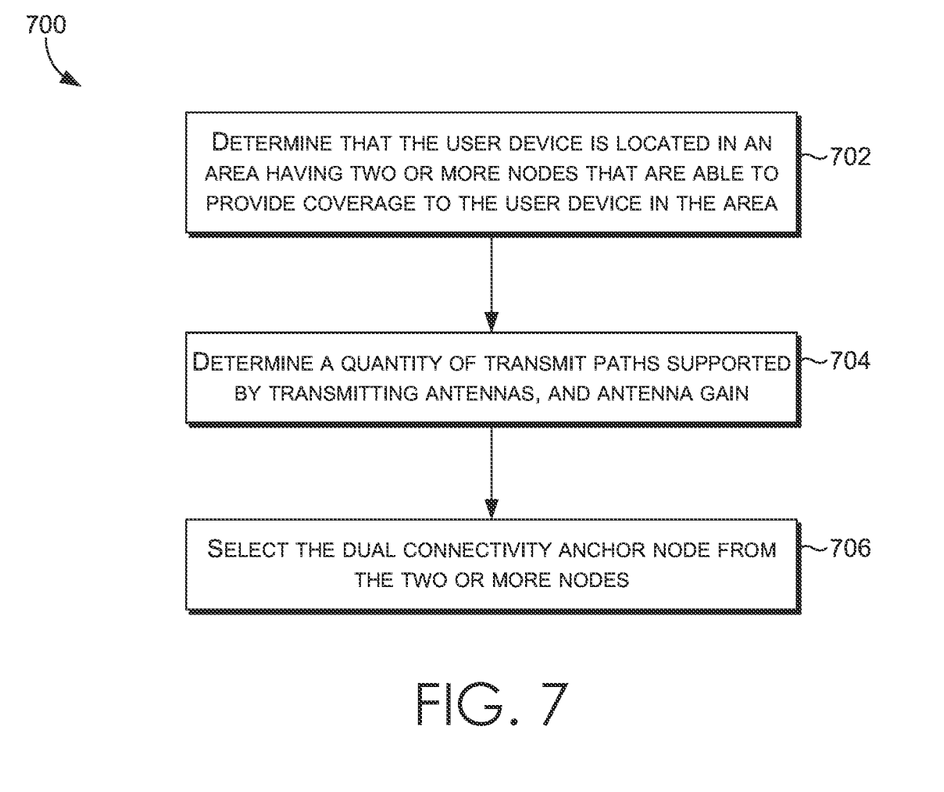

Turning now to FIG. 7, a flow diagram is depicted of an exemplary method 700 for dynamically selecting a dual connectivity anchor node for a user device, in accordance with aspects herein. At block 702, it is determined that the user device is located in an area having two or more nodes that are able to provide coverage to the user device in that area. As such, the user device and/or the network has a choice as to which node is to be used for primary communications with the user device, or which node is to be used as the anchor node. At block 704, a quantity of transmit paths supported by the transmitting antennas is determined, in addition to antenna gain. As discussed previously, in aspects, transmit paths correspond to antennas at a node. The more transmit paths are present, the more feasible it is to send additional data between a node and a user device, and thus may result in a greater throughput. At block 706, a dual connectivity anchor node is selected.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, and power supply 814. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data, signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 804 includes computer-storage media in the form of volatile and/or nonvolatile memory. Memory 804 may be removable, nonremovable, or a combination thereof. Exemplary memory includes solid-state memory, hard drives, optical-disc drives, etc. Computing device 800 includes one or more processors 806 that read data from various entities such as bus 802, memory 804 or I/O components 812. One or more presentation components 808 presents data, indications to a person or other device. Exemplary one or more presentation components 808 include a display device, speaker, printing component, vibrating component, etc. I/O ports 810 allow computing device 800 to be logically coupled to other devices including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamically selecting a dual connectivity anchor node for a user device, the system comprising:
   a processor; and
   one or more computer storage hardware devices storing computer-usable instructions that, when used by the processor, cause the processor to:
   determine that the user device is located in an area having two or more nodes that are able to provide coverage to the user device in the area;
   from broadcast messages, determine whether each of the two or more nodes has a connected mode discontinuous reception (CDRX) mode enabled;
   determine a Quality of Service (QoS) Class Identifier (OCI) for the user device; and
   based on whether the each of the two or more nodes has the CDRX mode enabled and the QCI for the user device, select one of the two or more nodes as the dual connectivity anchor node for the user device.

2. The system of claim 1, further comprising based on whether the each of the two or more nodes has the CDRX mode enabled and the QCI for the user device, determining that the user device is to connect to a node of the two or more nodes that has the CDRX mode enabled.

3. The system of claim 1, further comprising based on whether the each of the two or more nodes has the CDRX mode enabled and the QCI for the user device, determining that the user device is to connect to a node of the two or more nodes that has the CDRX mode disabled.

4. The system of claim 3, wherein it is determined that the user device is to connect to the node of the two or more nodes that has the CDRX mode disabled when the user device is currently operating voice over LTE (VoLTE), voice calling, videoconferencing, or gaming.

5. The system of claim 1, wherein the QCI is one or more QCIs associated with the user device.

6. The system of claim 5, further comprising determining a highest value QCI from the one or more QCIs.

7. The system of claim 1, wherein the selected dual connectivity anchor node has CDRX disabled when the user device is currently operating voice over LTE (VoLTE), voice calling, videoconferencing, or gaming.

8. The system of claim 1, wherein a node having CDRX enabled indicates that the node will enter into sleep mode at predetermined intervals.

9. The system of claim 1, wherein the QCI is associated with one or more applications currently running on the user device.

10. A method for dynamically selecting a dual connectivity anchor node for a user device, the method comprising:
    determining that the user device is located in an area having two or more nodes that are able to provide coverage to the user device in the area;
    from broadcast messages, determining whether each of the two or more nodes has a connected mode discontinuous reception (CDRX) mode enabled;
    determining a Quality of Service (QoS) Class Identifier (OCI) for the user device; and
    based on whether the each of the two or more nodes has the CDRX mode enabled and the QCI for the user device, selecting one of the two or more nodes as the dual connectivity anchor node for the user device.

11. The method of claim 10, further comprising based on whether the each of the two or more nodes has the CDRX mode enabled and the QCI for the user device, determining that the user device is to connect to a node of the two or more nodes that has the CDRX mode enabled.

12. The method of claim 10, further comprising based on whether the each of the two or more nodes has the CDRX mode enabled and the QCI for the user device, determining that the user device is to connect to a node of the two or more nodes that has the CDRX mode disabled.

13. The method of claim 10, wherein the QCI is one or more QCIs associated with the user device.

14. The media of claim 13, further comprising determining a highest value QCI from the one or more QCIs.

15. One or more non-transitory computer-readable media having computer-executable instructions embodied thereon that, when executed, perform a method for dynamically selecting a dual connectivity anchor node for a user device, the method comprising:
    determining that the user device is located in an area having two or more nodes that are able to provide coverage to the user device in the area;
    from broadcast messages, determining whether each of the two or more nodes has a connected mode discontinuous reception (CDRX) mode enabled;
    determining a Quality of Service (QoS) Class Identifier (OCI) for the user device; and
    based on whether the each of the two or more nodes has the CDRX mode enabled and the QCI for the user device, selecting one of the two or more nodes as the dual connectivity anchor node for the user device.

16. The media of claim 15, wherein the selected dual connectivity anchor node has CDRX disabled when the user device is currently operating voice over LTE (VoLTE), voice calling, videoconferencing, or gaming.

17. The media of claim 15, wherein it is determined that the user device is to connect to the node of the two or more nodes that has the CDRX mode disabled when the user device is currently operating voice over LTE (VoLTE), voice calling, videoconferencing, or gaming.

18. The media of claim 15, wherein the node having CDRX enabled indicates that the node will enter into sleep mode at predetermined intervals.

* * * * *